(12) United States Patent
Patterson et al.

(10) Patent No.: US 9,026,849 B2
(45) Date of Patent: May 5, 2015

(54) SYSTEM AND METHOD FOR PROVIDING RELIABLE STORAGE

(75) Inventors: Andrew Patterson, San Jose, CA (US); James Hughes, Palo Alto, CA (US); Hao Zhang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 660 days.

(21) Appl. No.: 13/215,345

(22) Filed: Aug. 23, 2011

(65) Prior Publication Data

US 2013/0055009 A1    Feb. 28, 2013

(51) Int. Cl.
| | | |
|---|---|---|
| G06F 11/00 | (2006.01) | |
| G06F 11/07 | (2006.01) | |
| G06F 11/14 | (2006.01) | |
| G06F 11/16 | (2006.01) | |
| G06F 11/20 | (2006.01) | |

(52) U.S. Cl.
CPC ........ *G06F 11/0727* (2013.01); *G06F 11/0793* (2013.01); *G06F 11/1402* (2013.01); *G06F 11/1662* (2013.01); *G06F 11/2094* (2013.01)

(58) Field of Classification Search
CPC ... G06F 3/0632; G06F 3/0659; G06F 3/0679; G06F 3/0689; G06F 9/4411; G06F 11/004; G06F 11/0724; G06F 11/0727; G06F 11/073; G06F 11/0793; G06F 11/1662; G06F 11/2094; G06F 12/0804; G06F 12/0866; G06F 2212/312
USPC ..................................................... 714/15, 20
See application file for complete search history.

(56) References Cited

U.S. PATENT DOCUMENTS

| | | | |
|---|---|---|---|
| 5,402,428 A | 3/1995 | Kakuta et al. | |
| 5,909,700 A | 6/1999 | Bitner et al. | |
| 6,052,758 A | 4/2000 | Crockett et al. | |
| 7,174,352 B2 | 2/2007 | Kleiman et al. | |
| 7,346,799 B2 * | 3/2008 | Uhlmann et al. | ................. 714/2 |

(Continued)

FOREIGN PATENT DOCUMENTS

| | | |
|---|---|---|
| CN | 101140536 A | 3/2008 |
| CN | 101741911 A | 6/2010 |

(Continued)

OTHER PUBLICATIONS

Cully, B., et al., "Remus: High Availability via Asynchronous Virtual Machine Replication," NSDI '08: 5$^{th}$ USENIX Symposium on Networked Systems Design and Implementation, pp. 161-174.

(Continued)

*Primary Examiner* — Bryce Bonzo
*Assistant Examiner* — Elmira Mehrmanesh
(74) *Attorney, Agent, or Firm* — Slater & Matsil, LLP

(57) ABSTRACT

A system and method for providing reliable storage are provided. A method for initiator operations includes storing information associated with an access attempt in a store, and accessing a storage system responsive to the access attempt, wherein the storage system includes a first storage node and a second storage node arranged in a sequential loop, and where the first storage node is accessed by an initiator. The method also includes determining if the access attempt completed successfully, deleting the information from the store if the access attempt completed successfully, and indicating an error if the access attempt did not complete successfully.

37 Claims, 11 Drawing Sheets

(56) References Cited

U.S. PATENT DOCUMENTS

| | | | |
|---|---|---|---|
| 7,373,366 | B1 | 5/2008 | Chatterjee et al. |
| 7,461,293 | B2 * | 12/2008 | Ohno et al. .................. 714/20 |
| 7,523,278 | B2 * | 4/2009 | Thompson et al. ........... 711/162 |
| 7,702,670 | B1 | 4/2010 | Duprey et al. |
| 7,870,356 | B1 | 1/2011 | Veeraswamy et al. |
| 8,010,495 | B1 | 8/2011 | Kuznetsov et al. |
| 8,209,568 | B2 * | 6/2012 | Marowsky-Bree et al. .... 714/48 |
| 8,554,734 | B1 | 10/2013 | Chatterjee et al. |
| 2003/0158869 | A1 | 8/2003 | Micka |
| 2004/0044864 | A1 | 3/2004 | Cavallo |
| 2004/0139128 | A1 | 7/2004 | Becker et al. |
| 2005/0027737 | A1 | 2/2005 | Micka et al. |
| 2005/0081099 | A1 | 4/2005 | Chang et al. |
| 2006/0047998 | A1 | 3/2006 | Darcy |
| 2007/0276885 | A1 | 11/2007 | Valiyaparambil et al. |
| 2009/0037676 | A1 | 2/2009 | Coronado et al. |
| 2009/0300305 | A1 | 12/2009 | Liu |
| 2010/0011177 | A1 | 1/2010 | Ainscow et al. |
| 2010/0023716 | A1 | 1/2010 | Nemoto et al. |
| 2010/0077165 | A1 | 3/2010 | Lu et al. |
| 2011/0161298 | A1 | 6/2011 | Grobman et al. |
| 2012/0331247 | A1 | 12/2012 | Hoobler, III et al. |

FOREIGN PATENT DOCUMENTS

| | | |
|---|---|---|
| CN | 101819543 A | 9/2010 |
| CN | 101888405 A | 11/2010 |

OTHER PUBLICATIONS

Extended European Search Report, Application No. PCT/CN/2011/083355, Applicant Huawei Technologies, Co., Ltd., Mar. 21, 2013, 10 pages.

International Search Report and Written Opinion of Patent Cooperation Treaty(PCT), International Application No. PCT/CN2011/083351, Applicant Huawei Technologies Co., Ltd., et al., date of mailing Apr. 12, 2012, 13 pages/.

United States Ofiice Action of U.S. Appl. No. 13/175,251, date of mailing Jun. 28, 2013, 25 pages.

Extended European Search Report, Application No. 11866436.6, date of mailing Aug. 13, 2013, Applicant Huawei Technologies Co., Ltd., 11 pages.

International Search Report of Patent Cooperation Treaty (PCT), International Application No. PCT/CN2011/083355, Applicant Huawei Tecnologies Co., Ltd., et al., date of mailing Mar. 22, 2012, 4 pages.

* cited by examiner

SYSTEM AND METHOD FOR PROVIDING RELIABLE STORAGE

TECHNICAL FIELD

The present invention relates generally to information storage, and more particularly to a system and method for providing reliable storage.

BACKGROUND

Generally, users of computing systems have a need to store data, applications, and so forth. Typically, the data, applications, and so on, may be stored on a storage device, which may be located locally with the user, remotely located from the user, or a combination thereof.

An important feature of a storage system may be a high degree of reliability. The high degree of reliability will help to ensure that the storage system is able to provide access to information stored in the storage system. Given that storage devices, especially mechanical storage devices, such as magnetic disk drives, magnetic tape, and so forth, may be prone to failure, the high degree of reliability may require the implementation of a system and method specifically designed to ensure the reliability of the storage system.

As an example, consider a user operating a virtual machine in a cloud computing environment. The user may have a need to access information stored on a storage device that may appear as a local device, but may actually be stored on a number of locations within the cloud computing infrastructure. The user may need to be able to read and/or write information to the storage device with high probability of success.

A prior art technique for providing high reliability in a storage system involves the use of multiple storage devices and creating a duplicate (i.e., a mirror) of the information or recovery information (e.g., parity information) for information stored on one or more of the storage devices onto one or more duplicate storage devices. However, the inherent redundancy may require a significant number of accesses to the multiple storage devices, thereby increasing communications interface overhead, messaging traffic, and so forth, which may negatively impact overall storage system performance.

Therefore, there is a need to provide a highly reliable storage system with reduced communications interface overhead, messaging traffic, and so on.

SUMMARY OF THE INVENTION

These and other problems are generally solved or circumvented, and technical advantages are generally achieved, by example embodiments of the present invention which provides a system and method for providing reliable storage.

In accordance with an example embodiment of the present invention, a method for initiator operations is provided. The method includes storing information associated with an access attempt in a store, and accessing a storage system responsive to the access attempt, where the storage system includes a first storage node and a second storage node arranged in a sequential loop, and where the first storage node is accessed by an initiator. The method also includes determining if the access attempt completed successfully, deleting the information from the store if the access attempt completed successfully, and indicating an error if the access attempt did not complete successfully.

In accordance with another example embodiment of the present invention, a method for storage node operations is provided. The method includes receiving, at a storage node, information associated with a write access attempt, where the storage node is part of a storage system that includes two storage nodes arranged in a sequential loop and where the information is received from a source. The method also includes writing a first subset of the information to a storage device, storing a second subset of the information in an attempt store, and sending a message to a recipient, where the message and the recipient are based on a position of the storage node in the sequential loop, and where the recipient is a different entity than the source.

In accordance with another example embodiment of the present invention, a device is provided. The device includes a store unit, an access unit, an error handling unit, and a storage control unit. The store unit stores information associated with an access attempt in a store, and the access unit accesses a first storage node of a storage system coupled to the device, where the access is responsive to the access attempt, and where the storage system includes the first storage node and a second storage node arranged in a sequential loop. The error handling unit determines if the access attempt completed successfully, where the store unit also deletes the information from the store if the access attempt completed successfully, and where the error handing unit also indicates an error if the access attempt did not complete successfully. The storage control unit attempts to connect to the first storage node and to the second storage node upon an indication of an error, where the access unit also re-accesses the storage system in response to determining that the attempt to connect succeeded.

In accordance with another example embodiment of the present invention, a device, where the device is part of a storage system that includes two devices arranged in a sequential loop, is provided. The device includes a receiver, an access unit, a store unit, and a transmitter. The receiver receives information associated with a write access attempt from an information source, the access unit writes a first subset of the information to a storage device, the store unit stores a second subset of the information in an attempt store, and the transmitter transmits a message to a recipient. The recipient and the message are based on a position of the device in the sequential loop, and where the information source includes an originator of the write access attempt and the recipient includes an ending storage node, or where the information source includes a beginning storage node and the recipient includes the originator of the write access attempt, or where the information source includes a downstream storage node and the recipient includes an upstream storage node.

In accordance with another example embodiment of the present invention, a method of storing and retrieving information is provided. The method includes writing first information from a computer to a first storage node of a remote storage system, where the remote storage system includes the first storage node and a second storage node arranged in a sequential loop such that the first information is copied to the second storage node, the second storage node being located remotely from the first storage node. The method also includes receiving a response from the second storage node at the computer, the response indicating that the information was successfully stored at the second storage node, and reading the first information from the first storage node of the remote storage system.

In accordance with another example embodiment of the present invention, a method for storing information is provided. The method includes receiving information from a computer at a first storage node of a storage system that includes the first storage node and a second storage node, saving information related to the information at the first storage node, sending the information from the first storage node to the second storage node, writing the information to a memory at the first storage node, writing the information to a memory at the second storage node, and sending a response from the second storage node to the computer to inform the computer that the information has been successfully written.

One advantage disclosed herein is that communications interface overhead, messaging traffic, and so forth, is reduced, thereby reducing a load on a computing system.

A further advantage of exemplary embodiments is that interaction with the high reliability storage system is consistent with existing high reliability storage systems, so no changes are needed to client side of the computing infrastructure.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One example embodiment of the invention relates to providing reliable storage for computing environments with a storage system that includes at least two storage devices arranged in a sequential loop. For example, in a write operation, information to be written to the storage system are received by and written to a first storage device and then copied to a second storage device. The second storage device then sends a response message to an originator of the information, informing the originator that the write operation completed successfully. While, in a read operation, the first storage device retrieves information requested by the read operation and provides it to the originator of the read operation. At a storage device of a storage system with at least two storage devices, the storage device receives information associated with a write operation and stores it in a memory. The storage device also stores information about the write operation in an alternate memory. The storage device further sends a message regarding the write operation to a recipient, where the recipient is different than a source from where the storage device received the information. The message and the recipient are based on a position of the storage device in the storage system.

The present invention will be described with respect to example embodiments in a specific context, namely a cloud computing environment with users having information to store and access in a storage device. The invention may also be applied, however, to other computing environments, such as client-server, standalone, thin client, and so forth, where users have information to store in a storage device.

Figure 1:
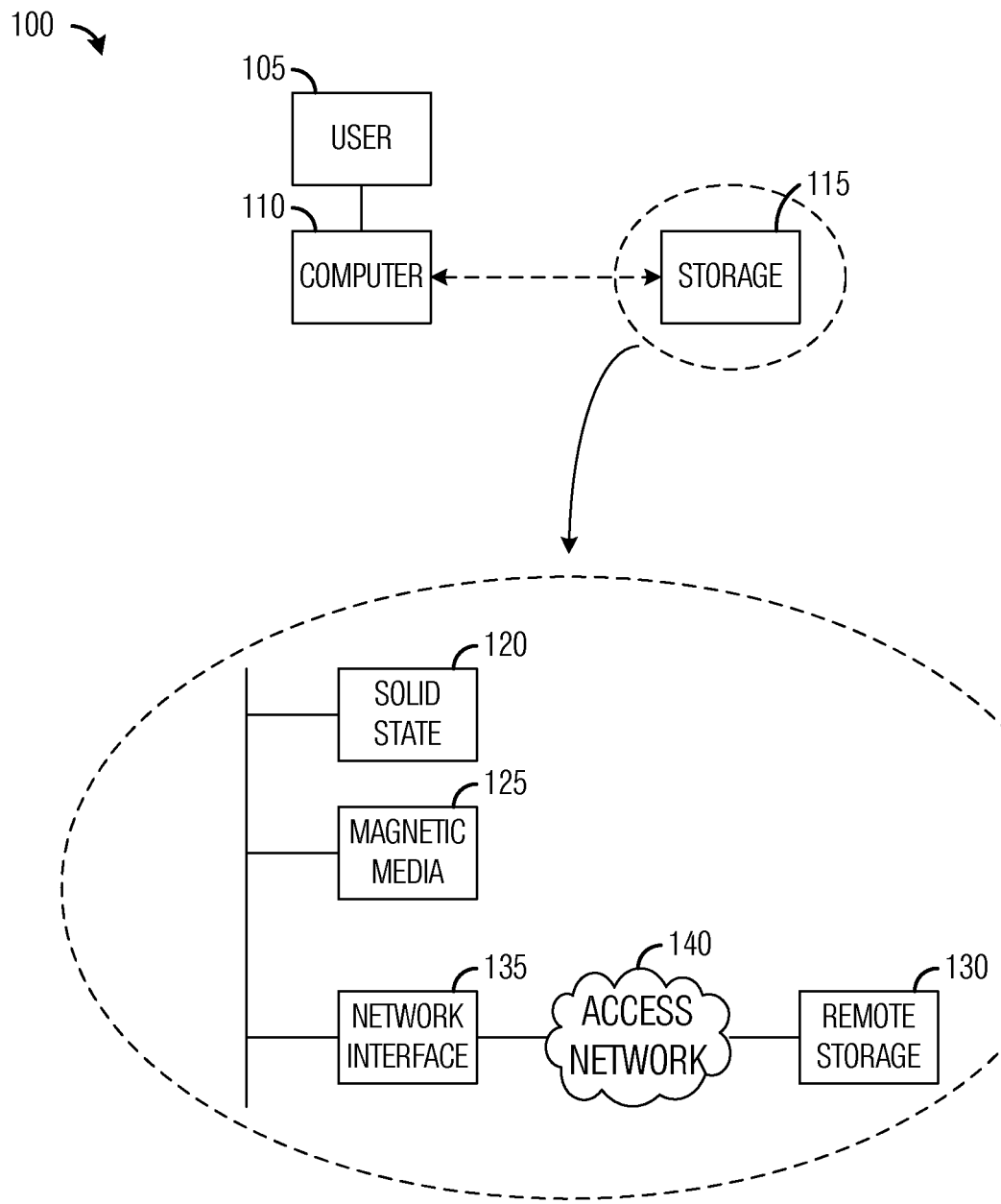
FIG. 1 illustrates an example computing environment according to example embodiments described herein.

FIG. 1 illustrates a computing environment 100. Computing environment 100 includes a user 105 that may be using a computer 110 coupled to a storage device 115. User 105 may use storage device 115 to store information, such as data, media, as well as applications, and so on. Computer 110 may make use of applications stored in storage device 115 to process data, display media, and so forth.

While it is understood that computing environments may employ multiple computers used by multiple users and are capable of storing information on multiple storage devices, only one user, one computer, and one storage device are illustrated for simplicity.

Storage device 115 may be realized as a solid state memory 120 (such as flash memory, solid state hard drive, etc.), a magnetic media 125 (such as magnetic disk drive, magnetic tape, or so on), and/or optical media that is directly coupled to computer 110, or remote storage 130 coupled to computer 110 through a network interface 135 and an access network 140. Storage device 115 may also be realized as combinations of the above.

As discussed previously, a high reliability storage system may provide a user the ability to access, such as read and/or write, information with a very low failure rate. In order to provide high reliability, the storage system may need to utilize components with low failure rates, as well as provide mechanisms to detect an occurrence of a failure and to recover from the failure. Furthermore, the high reliability storage system may allow the user continued access to information even after a failure has occurred and while recovery from the failure is taking place.

Figure 2A:
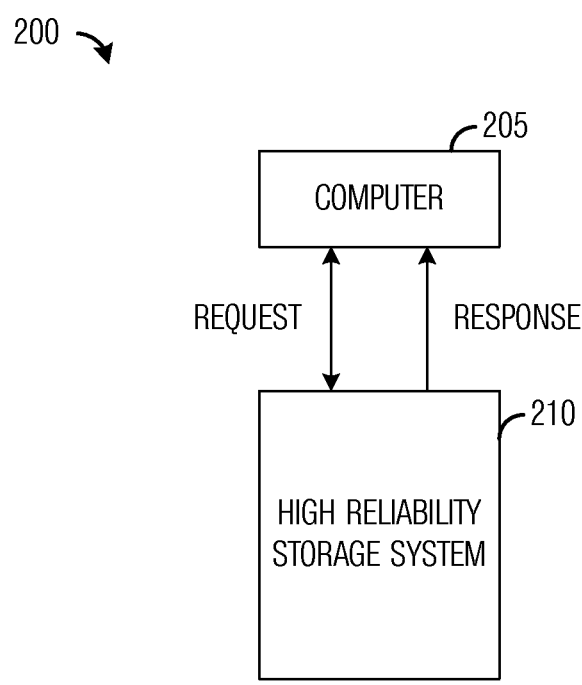
FIG. 2a illustrates a high level view of an example computing system according to example embodiments described herein.

FIG. 2a illustrates a high level view of a computing system 200. Computing system 200 includes a computer 205 and a high reliability storage system 210 coupled to computer 205. While it is understood that computing systems may employ multiple computers capable of accessing multiple storage systems, only one computer and one high reliability storage system are illustrated for simplicity.

Computer 205 may be responsible for executing virtual machine (VM) instances. Computer 205 may include an interface to high reliability storage system 210. Details regarding the interface to high reliability storage system 210 are provided below.

High reliability storage system 210 may include one or more storage devices, such as solid state memory, magnetic media devices (e.g., disk drives, magnetic tape), optical devices, and so forth, which may be local to computer 205, coupled to computer 205 through an access network, or a combination thereof.

Computer 205 may communicate with high reliability storage system 210 by issuing requests (e.g., a read request and/or a write request) to high reliability storage system 210 and receiving responses from high reliability storage system 210. The responses may be in the form of information requested in a read access attempt and/or an acknowledgement to a write access attempt. Furthermore, requests may include state information, control commands, synchronization information, time information, and so forth. Additionally, responses may include error information, state information, and so on.

Figure 2B:
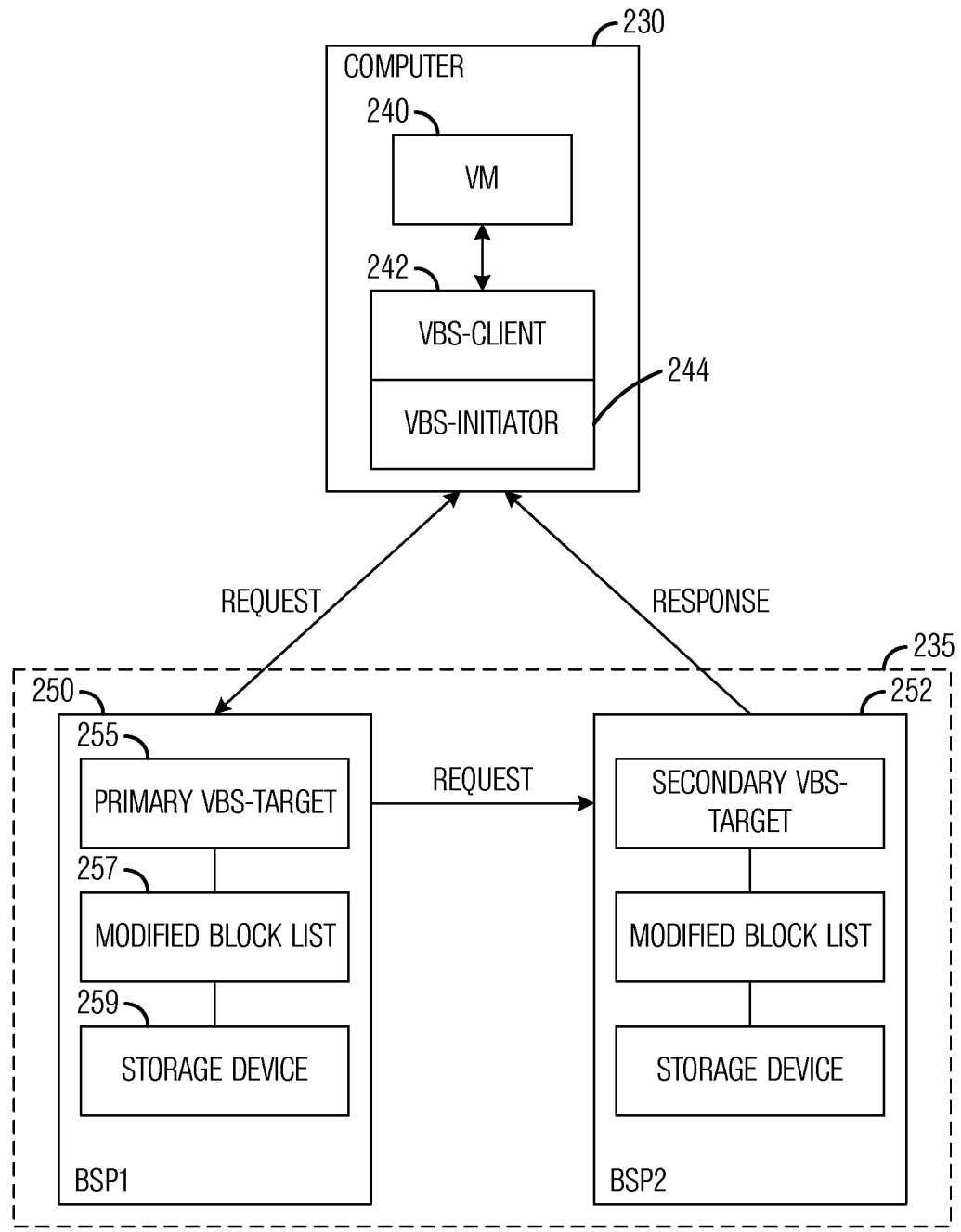
FIG. 2b illustrates a detailed view of an example computing system according to example embodiments described herein.

FIG. 2b illustrates a detailed view of a computing system 225. Computing system 225 includes a computer 230 and a high reliability storage system 235 coupled to computer 230. Computer 230, also commonly referred to as a compute node agent (CNA), may be responsible for executing VM instances. Computer 230 includes a VBS-client 242 executing in user space and a VBS-initiator 244 executing in kernel space.

VBS-client 242 may be a user space administration tool for VBS-initiator 244. For example, VBS-client 242 may communicate with VBS-initiator 244 via Unix input/output control (ioctl) and Linux virtual file system (sysfs) commands. While VBS-initiator 244 may be a VBS block device driver that provides a standard block device interface to the volume. VBS-client 242 and VBS-initiator 244 may serve as interface to high reliability storage system 235.

High reliability storage system 235 may include a plurality of storage nodes, such as first storage node 250 and second storage node 252. The plurality of storage nodes may be arranged sequentially, such as in a loop, and individual storage nodes in the plurality of storage nodes may be referenced by their position in the sequence. For example, as shown in FIG. 2b, first storage node 250 is the first storage node in the plurality of storage nodes and second storage node 252 is the second storage node in the plurality of storage nodes. Although shown in FIG. 2b as being a unidirectional sequence, it may be possible to rearrange the order of the storage nodes. For example, second storage node 252 may be the first storage node and first storage node 250 may be the second storage node.

Although shown in FIG. 2b as comprising two storage nodes, a high reliability storage system may typically include any number of storage nodes, such as one, two, three, four, five, and so forth. As shown in FIG. 2b, first storage node 250 may also be referred to as a primary storage node and second storage node 252 may also be referred to as a secondary storage node. However, first storage node 250 and second storage node 252 may also be second storage node and primary storage node, respectively.

According to an example embodiment, a high reliability storage system may contain a large number of storage nodes; however, a single computer may not need to be attached to every storage node of the high reliability storage system. For example, a high reliability storage system may contain 10 storage nodes, but each computer attached to the high reliability storage system may be attached to two storage nodes out of the 10 storage nodes. Therefore, the high reliability storage system may be able to support up to five different computers without having to support more than one computer per storage node.

Furthermore, in situations where a high reliability storage system contains a large number of storage nodes and a computer is attached to a subset of the storage nodes of the high reliability storage system, it may be simpler for discussion purposes to refer to the subset of storage nodes as the storage nodes of the high reliability storage system for the computer. Therefore, the discussion of a computer being attached to the storage nodes of a high reliability storage system should not be construed as limiting the number of computers that can be supported by the high reliability storage system, as well as requiring that the computer be attached to all of the storage nodes in the high reliability storage system, or vice versa.

According to an example embodiment, first storage node 250 may include a VBS-target 255 that may operate as a VBS block device server, a modified block list 257, and a storage device 259. VBS-target 255 may permit access, such as read access and/or write access, to storage device 259. VBS-target 255 may communicate with VBS-initiator 244. Second storage node 252 may have its own corresponding VBS-target, modified block list, and storage device.

Modified block list 257 may be a list of blocks in storage device 259 that have been modified, i.e., written to, since a most recent synchronization or checkpoint. Modified block list 257 may be maintained by VBS-target 255 for storage device 259. If storage device 259 comprises multiple forms and/or types of storage entities, such as disk drives, tape, memory, and so on, a modified block list or multiple modified block lists may be maintained to keep track of changes to each of the multiple storage entities. Modified block list 257 and storage device 259 may be implemented on a media, such as dynamic memory (e.g., random access memory, and so on), solid state memory, magnetic media, and so forth. The media may be representative of a file system local to first storage node 250.

According to an example embodiment, the storage nodes of high reliability storage system 235 may be arranged in a sequential loop, also referred to herein as a triangular configuration, rather than a more traditional multi-legged configuration. So arranged, VBS-initiator 244 may not be able to directly communicate to all of the storage nodes of high reliability storage system 235, as it would be able to do in the multi-legged configuration. Instead, VBS-initiator 244 may directly communicate with the primary storage node (i.e., first storage node 250) through its VBS-target, which in turn communicates with the secondary storage node (i.e., second storage node 252) through its VBS-target. The secondary storage node (assuming a two storage node configuration as shown in FIG. 2b), through its VBS-target, may then communicate with VBS-initiator 244.

In general, a source of message may be referred to as a downstream device and a recipient of a message may be referred to as an upstream device.

The triangular configuration may have an advantage over the multi-legged configuration with a reduction in the amount of message traffic traversing between computer 230 and high reliability storage system 235. As an example, consider a two storage node high reliability storage system arranged in a two-legged configuration. In such a configuration, the number of messages sent for each write access is four, with two messages exchanged per write to each of the two storage nodes. While in a corresponding triangular configuration with two storage nodes, only three messages are sent, with one message sent to the primary storage node from the computer, one message sent between the primary storage node and the secondary storage node, and one message sent between the secondary storage node to the computer.

An access attempt from computer 230 to high reliability storage system 235 may either be in the form of a write access attempt or a read access attempt. A write access attempt may be sent from computer 230 to the primary storage node, which may then forward the write access attempt to the secondary storage node, and so on. A final storage node in high reliability storage system 235 (e.g., the secondary storage node in a two storage node system) may then send an acknowledgement to computer 230 to indicate that the write access attempt completed successfully.

In general, computer 230 sends the write access attempt to the primary storage node 250 and receives an acknowledgement corresponding to the write access attempt from a final storage node (e.g., the secondary storage node 252 in a two storage node system) indicating that the write access attempt successfully completed. If computer 230 does not receive the acknowledgement to the write access attempt, then computer 230 may consider the write access attempt to have failed and error recovery may need to be performed to determine where and/or when the error occurred. Error recovery may also attempt to recover from the error, if possible. A detailed discussion of error recovery is provided below.

According to an example embodiment, to potentially help improve performance, in addition to writing information associated with each write access attempt to a storage device, a storage node (e.g., the primary storage node and/or the secondary storage node) may maintain a list of write access attempts received, for example. The list, hereinafter referred to as a block list, comprises an offset (e.g., a position indicator) to a block on the storage device where the information associated with the write access attempt was written and an indication (e.g., a length indicator) of the size and/or amount of information written.

According to an example embodiment, the block list may contain information about the write access attempts received by the storage node since a most recent synchronization. Once a new synchronization is performed, the block list may be cleared. The block list may be stored in a media, such as a memory of the storage node. The use of the block list may allow the storage node to handle multiple write access attempts before the information associated with the write access attempts is actually written to the storage device.

A size of the block list may be dependent upon a number of factors, including but not limited to an expected amount of time between synchronizations, an expected number of write access attempts, available media for storage, and so on. A block list that is too large may result in a waste of potentially value media storage space, while a block list that is too small may result in an inability to store some write access attempts in the block list.

According to an example embodiment, a read access attempt does not need to be propagated to all of the storage nodes in high reliability storage system 235. In general, since write access attempts are first sent to the primary storage node, read access attempts may also be sent to the primary storage node. Since there may be some amount of latency between the storage nodes (since a write access attempt is first sent to the primary storage node then propagated to the secondary storage node and so on), there may be small instances in time when there is an inconsistency in what is stored in the storage nodes. Therefore, sending a read access attempt to the primary storage node helps to ensure that information received in response to a read access attempt is correct.

Figure 2C:
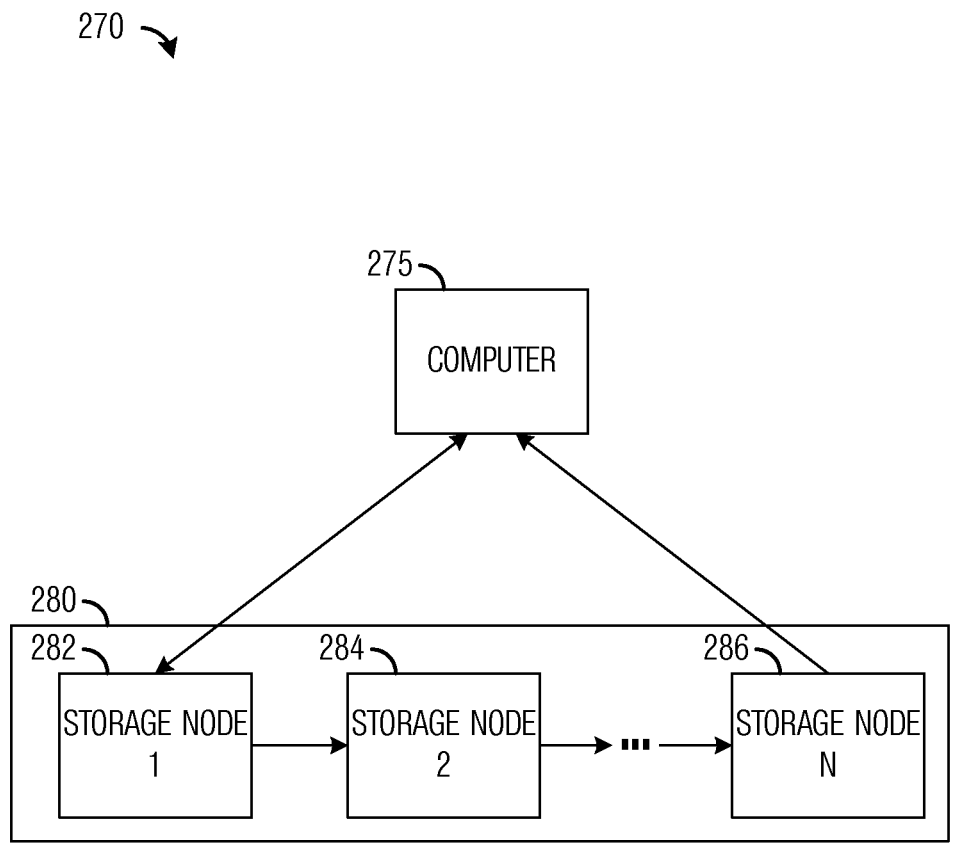
FIG. 2c illustrates a high level view of an example computing system with N storage nodes according to example embodiments described herein.

FIG. 2c illustrates a high level view of a computing system 270 with N storage nodes. Computing system 270 includes a computer 275 coupled to a high reliability storage system 280. High reliability storage system 280 includes N storage nodes: storage node 1 282 (primary storage node), storage node 2 284 (secondary storage node), to storage node N 286 (final storage node). High reliability storage system 280 operates as described previously, wherein write access attempts are first sent to the primary storage node and forwarded to the other the storage nodes until the final storage node sends an acknowledgement to computer 275.

Figure 3:
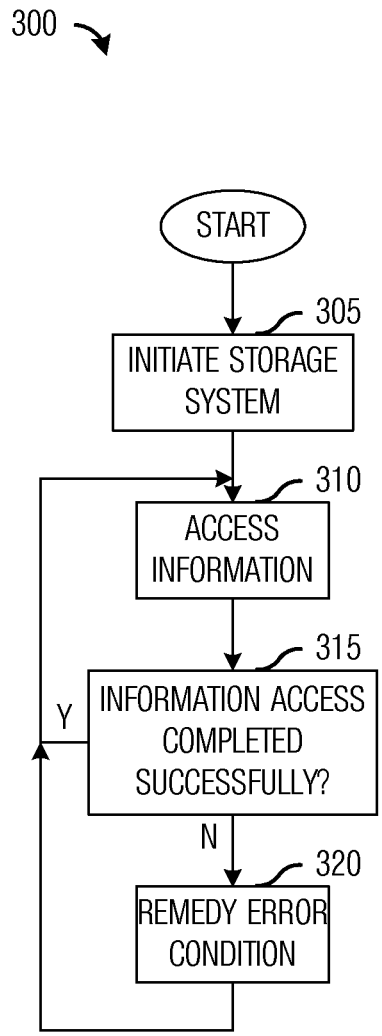
FIG. 3 illustrates an example flow diagram of VBS-client operations according to example embodiments described herein.

FIG. 3 illustrates a flow diagram of VBS-client operations 300. VBS-client operations 300 may be indicative of operations occurring in a VBS-client, such as VBS-client 242, of a computer, such as computer 230, as the VBS-client operates as an interface with a high reliability storage system, such as high reliability storage system 210, 235, and/or 280. VBS-client operations 300 may occur while the VBS-client is in a normal operating mode.

VBS-client operations 300 may begin with an initiation of the high reliability storage system (block 305). Initiation of the high reliability storage system may include the VBS-client (through a VBS-initiator serving as an interface between the computer/the VBS-client and the high reliability storage system) connecting to VBS-targets, e.g., the storage nodes making up the high reliability storage system, in the high reliability storage system and interrogating their status. Interrogation of the VBS-targets may include checking if the VBS-targets where closed cleanly when they were last shutdown, determining a timestamp of the VBS-targets' most recent checkpoint, and so on.

Part of the interrogation process may include synchronizing the storage nodes associated with the VBS-targets. For example, if the timestamps of the checkpoints of the storage nodes do not match, the VBS-client may have the VBS-targets perform a synchronization operation so that the timestamps match. By synchronizing the VBS-targets, it may be ensured that the storage nodes at all at the same state before operation commences.

Once the high reliability storage system is initiated, the VBS-client may access information stored on the high reliability storage system (block 310). According to an example embodiment, the VBS-client may typically access information stored on the high reliability storage system with either a write access attempt wherein information provided with the write access attempt may be written to one or more blocks in the high reliability storage system or a read access attempt wherein information stored in one or more blocks in the high reliability storage system may be read and provided to the VBS-client.

According to an example embodiment, the VBS-client may access information by sending an access attempt (e.g., either a write access attempt or a read access attempt) to a primary storage node in the high reliability storage system. If the access attempt is a read access attempt, then the primary storage node may respond to the read access attempt by sending information corresponding to the read access attempt directly to the VBS-client.

However, if the access attempt is a write access attempt, the primary storage node may forward the write access attempt to other storage nodes arranged in a sequential loop in the high reliability storage system instead of responding to the VBS-client directly. The storage nodes (including the primary storage node) may write information associated with the write access attempt to their respective storage devices and update their own modified block list with information about the write access attempt. A final storage node (for example, a secondary storage node in a two storage node system) in the high reliability storage system may, in addition to writing the information associated with the write access attempt and updating its own modified block list, send an acknowledgement to the VBS-client rather than sending the write access attempt to another storage node. The acknowledgement to the VBS-client may signify to the VBS-client that the write access attempt has successfully completed. In other words, the information associated with the write access attempt has been stored at each of the storage nodes in the high reliability storage system.

According to an example embodiment, if the VBS-client is capable of waiting until the storage nodes in the high reliability storage system becomes synchronized, the access attempts may be initially sent to any storage node in the high reliability storage system instead of only the primary storage node. If the access attempt is a read access attempt, then the storage node receiving the access attempt may respond to the access attempt. If the access attempt is a write access attempt, then the storage node may store information associated with the access attempt, update its own modified block list, and forward the access attempt to a next storage node in the high reliability storage system. Furthermore, in a final storage node, instead of forwarding the access attempt to another storage node, the final storage node may send an acknowledgement to the VBS-client.

If the VBS-client receives an indication from the final storage node when the access attempt is a write access attempt or information corresponding to the access attempt when the access attempt is a read access attempt, then the VBS-client may consider the access attempt to have completed successfully (block 315) and return to block 310 for additional access attempts. However, if the VBS-client does not receive the indication from the final storage node or the information corresponding to the access attempt at all or before a specified time interval expires (e.g., upon expiration of a timer), then the VBS-client may consider that the access attempt failed, that an error condition exists, and may take steps to remedy the error condition (block 320). A description of an example embodiment to remedy an error condition is provided below. With the error condition remedied, the VBS-client may return to block 310 for additional access attempts.

Figure 4A:
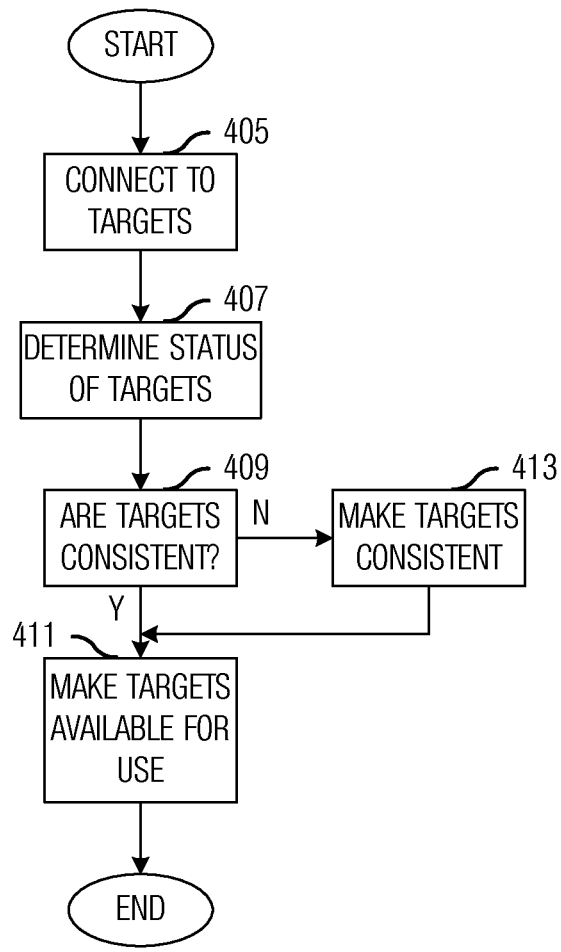
FIG. 4a illustrates an example flow diagram of VBS-initiator operations in initiating a high reliability storage system according to example embodiments described herein.

FIG. 4a illustrates a flow diagram of VBS-initiator operations 400 in initiating a high reliability storage system. VBS-initiator operations 400 may be indicative of operations occurring in a VBS-initiator, such as VBS-initiator 244, as the VBS-initiator initiates storage nodes in the high reliability storage system in preparation for use by a computer, such as computer 230. VBS-initiator operations 400 may occur while the VBS-initiator is in a normal operating mode.

VBS-initiator operations 400 may begin with the VBS-initiator (responding to communications from a VBS-client, for example, via Unix input/output control (ioctl) and Linux virtual file system (sysfs) commands) connecting to storage nodes (through VBS-targets controlling the storage nodes) in the high reliability storage system (block 405). The VBS-initiator may communicate with the VBS-targets using a communications protocol, such as, a Linux network block device (NBD) protocol.

The VBS-initiator may determine a status of the storage nodes associated with the VBS-targets in the high reliability storage system (block 407). For example, the status of the storage nodes and/or the VBS-targets may include checking if the VBS-targets where closed cleanly when they were last shutdown, determining a timestamp of the VBS-targets' most recent checkpoint, and so on. In general, the status of the storage nodes and/or the VBS-targets may indicate if they are consistent or are in a consistent state.

The VBS-initiator may perform a check to determine if the storage nodes and/or the VBS-targets are consistent (block 409). If the storage nodes and/or the VBS-targets are consistent, then the VBS-initiator may make the storage nodes and/or the VBS-targets (i.e., the high reliability storage system) available for use by the computer (block 411). The computer may access information stored in the high reliability storage system in the form of read access attempts and/or write access attempts.

However, if the high reliability storage system (i.e., the storage nodes and/or the VBS-targets) are not consistent, then the VBS-initiator may make the high reliability storage system consistent (block 413) and then make the high reliability storage system available for use by the computer. According to an example embodiment, the VBS-initiator may make the high reliability storage system consistent by having the VBS-targets performing a checkpoint synchronization so that all of the VBS-targets have the same checkpoint timestamp. By synchronizing the VBS-targets, it may be ensured that the storage nodes at all at the same state (i.e., store the same information) before operation commences.

Figure 4B:
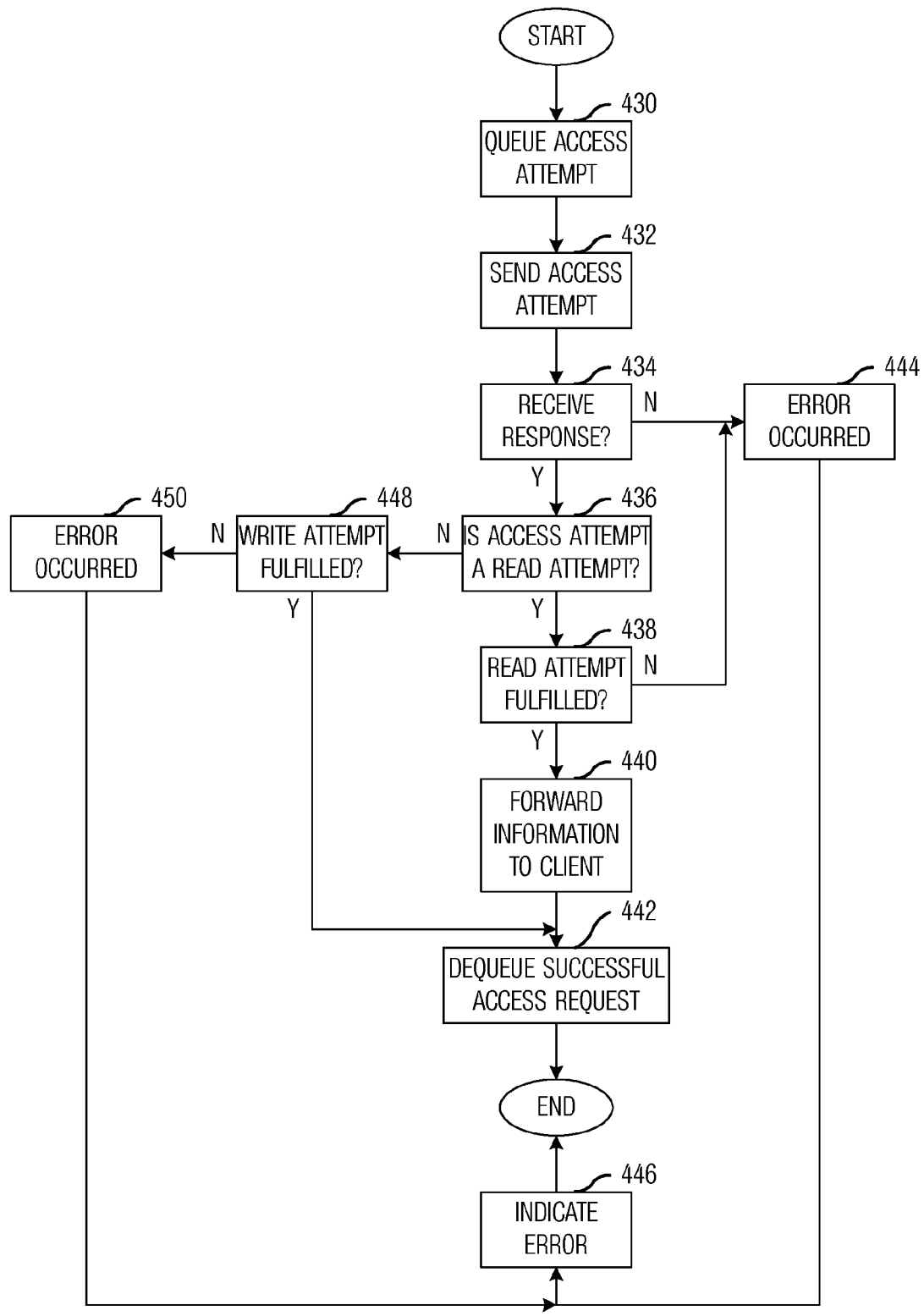
FIG. 4b illustrates an example flow diagram of VBS-initiator operations in performing an access attempt on information stored in a high reliability storage system according to example embodiments described herein.

FIG. 4b illustrates a flow diagram of VBS-initiator operations 425 in performing an access attempt on information stored in a high reliability storage system. VBS-initiator operations 425 may be indicative of operations occurring in a VBS-initiator, such as VBS-initiator 244, as the VBS-initiator accesses information stored in the high reliability storage system as controlled by a computer, such as computer 230. VBS-initiator operations 425 may occur while the VBS-initiator is in a normal operating mode.

VBS-initiator operations 425 may begin with the VBS-initiator receiving an access attempt from the computer by way of a VBS-client, which may serve as an interface between the computer and the VBS-initiator. In addition to receiving the access attempt, the VBS-initiator may store (e.g., queue or place in a list) the access attempt (block 430). According to an example embodiment, the VBS-initiator may store the access attempt in a queue or a list of outstanding access attempts, which maintains a list of access attempts received by the VBS-initiator that have not successfully completed.

The VBS-initiator may send the access attempt to the high reliability storage system, e.g., the primary storage node of the high reliability storage system (block 432). The VBS-initiator may perform a check to determine if it has received a response to the access attempt (block 434).

According to an example embodiment, the VBS-initiator may receive a response to the access attempt that corresponds to a type of the access attempt, e.g., either a read access attempt or a write access attempt. For example, the VBS-initiator may receive information corresponding to a read access attempt or an acknowledgement indicating that a write access attempt successfully completed. Alternatively, the VBS-initiator may receive a response indicating that the access attempt failed. While the response may not be sufficient ensure that the access attempt succeeded, it may ensure that an underlying communications infrastructure is operational.

According to an example embodiment, the VBS-initiator may not receive a response to the access attempt and after a timer that may be used to determine if the VBS-initiator has waited too long for a response from the high reliability storage system expires, the VBS-initiator may determine that the access attempt failed, either due to a hardware failure or software failure.

If the VBS-initiator received a response to the access attempt, the VBS-initiator may perform a check to determine a type of the access attempt (e.g., if the access attempt is a write access attempt or a read access attempt) (block 436).

If the access attempt is a read access attempt, then the VBS-initiator may perform a check to determine if the read access attempt succeeded successfully (the read access attempt was fulfilled), e.g., the response to the access attempt contained information requested in the read access attempt (block 438).

If the read access attempt succeeded successfully, then the VBS-initiator may forward the information to the VBS-client (block 440) and dequeue (or remove) the access attempt from the queue (or list) of outstanding access attempts (block 442).

If the read access attempt failed, then the VBS-initiator may determine that an error has occurred (block 444) and may indicate that an error as occurred (block 446), which may be used to remedy the error condition. According to an example embodiment, indicating that an error has occurred may include setting an error indicator to a pre-determined value, setting an error flag, asserting an interrupt, or so forth.

If the access attempt is a write access attempt, then the VBS-initiator may perform a check to determine if the write access attempt succeeded successfully (the write access attempt was fulfilled), e.g., the response to the access attempt contained an acknowledgement that the access attempt succeeded (block 448).

If the write access attempt succeeded successfully, then the VBS-initiator may dequeue (or remove) the access attempt from the queue (or list) of outstanding access attempts (block 442).

If the write access attempt failed, then the VBS-initiator may determine that an error has occurred (block 450) and may indicate that an error as occurred (block 446), which may be used to remedy the error condition.

If the VBS-initiator does not receive the response to the access attempt within an allotted time period, e.g., the timer expires, the VBS-initiator may determine that an error has occurred (block 444) and may indicate that an error as occurred (block 446), which may be used to remedy the error condition.

Figures 4C, 4D:
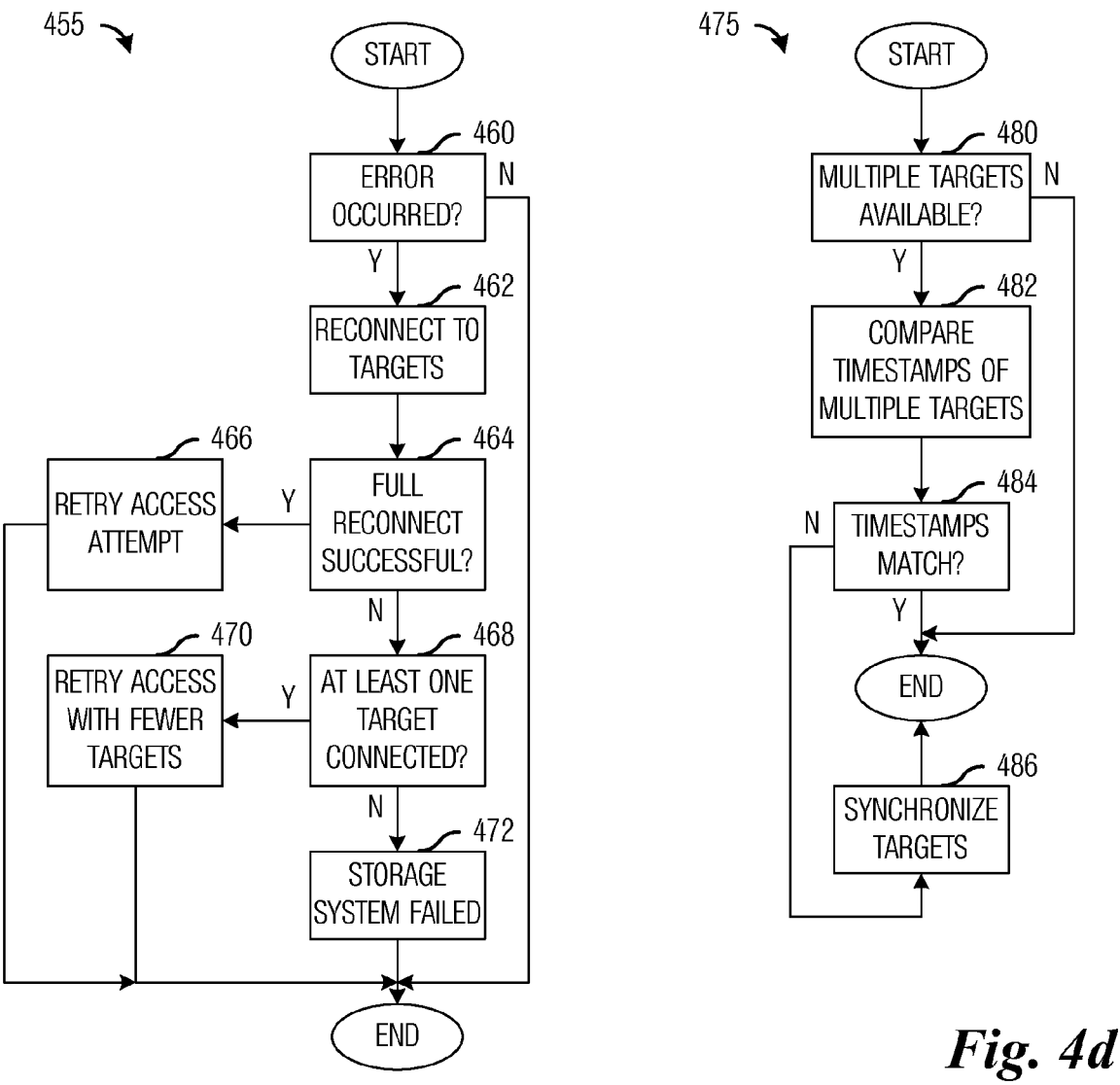
FIG. 4c illustrates an example flow diagram of VBS-initiator operations in remedying an error condition in a high reliability storage system according to example embodiments described herein.
FIG. 4d illustrates an example flow diagram of VBS-initiator operations in recovering from an error condition in a high reliability storage system by reconnecting with a storage node according to example embodiments described herein.

FIG. 4c illustrates a flow diagram of VBS-initiator operations 455 in remedying an error condition in a high reliability storage system. VBS-initiator operations 455 may be indicative of operations occurring in a VBS-initiator, such as VBS-initiator 244, as the VBS-initiator applies a remedy to an error condition in the high reliability storage system. VBS-initiator operations 455 may occur while the VBS-initiator is in a normal operating mode.

VBS-initiator operations 455 may begin with the VBS-initiator performing a check to determine if an error has occurred (block 460). According to an example embodiment, the VBS-initiator may check for an error indication that indicates that an error has occurred, for example, as described in the description of FIG. 4b. If an error has not occurred, then VBS-initiator operations 455 may then terminate.

If an error has occurred, the VBS-initiator may attempt to reconnect to the storage nodes of the high reliability storage system (block 462). If the VBS-initiator was able to connect to all of the storage nodes in the high reliability storage system, thereby indicating that the error may have been the result of a transient error (block 464) then the VBS-initiator may retry the access attempt that led to the error condition (block 466).

If the VBS-initiator was able to connect to a subset of the storage nodes in the high reliability storage system (block 468) then the VBS-initiator may retry the access attempt that led to the error condition with as many storage nodes as it was able to connect with (block 470).

However, if the VBS-initiator was not able to connect to any of the storage nodes in the high reliability storage system (block 468), then the VBS-initiator may determine that the high reliability storage system has failed (block 472). The VBS-initiator may need to halt operations and retry at a later time or stop altogether.

FIG. 4d illustrates a flow diagram of VBS-initiator operations 475 in recovering from an error condition in a high reliability storage system by reconnecting with a storage node. VBS-initiator operations 475 may be indicative of operations occurring in a VBS-initiator, such as VBS-initiator 244, as the VBS-initiator recovers from an error condition in the high reliability storage system by reconnecting with a storage node that formerly failed. VBS-initiator operations 475 may occur while the VBS-initiator is in a normal operating mode.

VBS-initiator operations 475 may begin with the VBS-initiator performing a check to determine if multiple storage nodes in the high reliability storage system are available for use (block 480). If multiple storage nodes in the high reliability storage system are available for use, then the VBS-initiator may perform a check to determine if checkpoint timestamps of the various storage nodes match, which may include the checkpoint timestamp of a formerly failed storage node (block 482). If the checkpoint timestamp of the various storage nodes match (block 484), then the VBS-initiator may allow access attempts to information in the high reliability storage system.

However, if the checkpoint timestamps of the various storage nodes do not match (block 484), then the VBS-initiator may synchronize the various storage nodes (block 486) before allowing access attempts to information in the high reliability storage system. According to an example embodiment, the VBS-initiator may synchronize the various storage nodes with unsuccessful and/or un-acknowledged access attempts that have occurred since a common checkpoint timestamp for the various storage nodes. If there is no common checkpoint timestamp between the various storage nodes, the various storage nodes may need to be synchronized in their entirety with storage nodes that were not faulty.

Figures 5A, 5B:
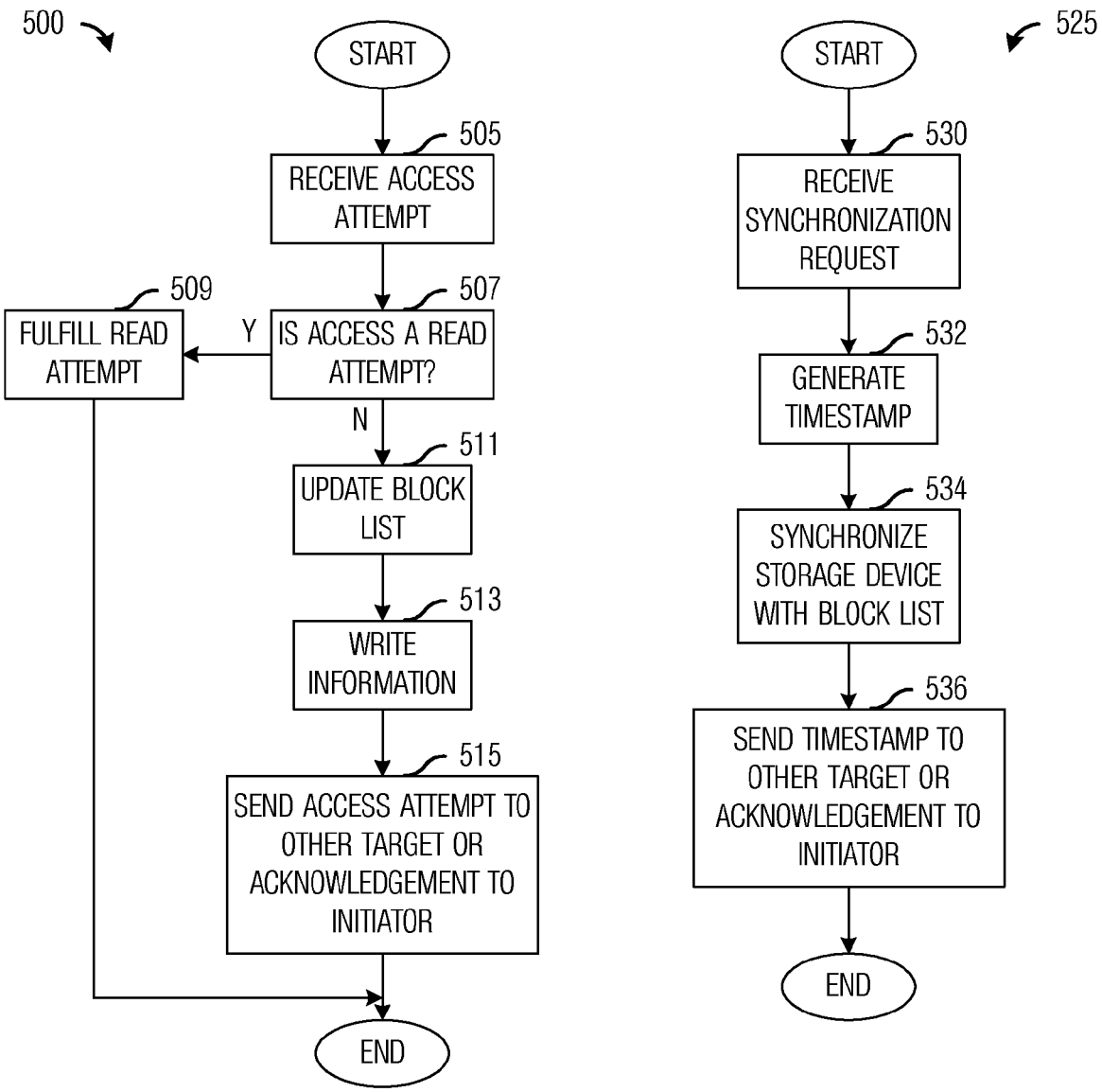
FIG. 5a illustrates an example flow diagram of VBS-target operations in responding to an access attempt according to example embodiments described herein.
FIG. 5b illustrates an example flow diagram of VBS-target operations in performing a checkpoint synchronization according to example embodiments described herein.

FIG. 5a illustrates a flow diagram of VBS-target operations 500 in responding to an access attempt. VBS-target operations 500 may be indicative of operations occurring in a VBS-target, such as VBS-target 255, of a storage node, such as storage node 250, as the VBS-target responds to access attempts from a computer, such as computer 230. VBS-target operations 500 may occur while the VBS-target is in a normal operating mode.

VBS-target operations 500 may begin with the VBS-target receiving an access attempt from a VBS-initiator of the computer (block 505). As discussed previously, there may be two different types of access attempts, namely, a read access attempt and a write access attempt. The VBS-target may respond differently depending on the type of the access attempt. Furthermore, a relative position of the storage device coupled to the VBS-target may also impact how the VBS-target responds. For example, the VBS-target may respond differently if it is in a situation where it is coupled to a primary storage node when compared to a situation where it is coupled to a final storage node.

The VBS-target may perform a check to determine if the access attempt is a read access attempt (block 507). If the access attempt is a read access attempt, then the VBS-target may fulfill the read attempt by retrieving requested information from its storage device (block 509). According to an example embodiment, read access attempts are typically only sent to primary storage nodes, so if the VBS-target knows that it is not coupled to the primary storage node, then it may be able to skip the check to determine the type of the access attempt.

If the access attempt is a write access attempt, then the VBS-target may update its block list with information associated with the write access attempt, including which blocks are affected by the write access attempt, amount of information being written, time of the write access attempt, and so on (block 511). The VBS-target may also write the information to be written to its storage device (block 513).

After updating its block list and writing the information to the storage device, the VBS-target may send a message to either a next VBS-target in the sequential loop in the high reliability storage system, wherein the message comprises the write access attempt, or send an acknowledgement to the VBS-initiator that indicates that the access attempt successfully completed (block 515).

According to an example embodiment, the VBS-target's behavior may differ depending on its position in the high reliability storage system. Consider a scenario wherein the VBS-target is coupled to either the primary storage node or an intermediate storage node, then the VBS-target may send the message to either a next VBS-target in the high reliability storage system. As an example, consider a high reliability storage system with three storage nodes: a first storage node, a second storage node, and a third storage node. Then, if the VBS-target is coupled to either the first storage node or the second storage node, then the VBS-target may send the message to either a next VBS-target in the sequential loop in the high reliability storage system (to the second storage node if the VBS-target is coupled to the first storage node or to the third storage node if the VBS-target is coupled to the second storage node).

Consider a scenario wherein the VBS-target is coupled to the final storage node, then the VBS-target may send the acknowledgement to the VBS-initiator that indicates that the access attempt successfully completed. As an example, again consider a high reliability storage system with three storage nodes: a first storage node, a second storage node, and a third storage node. Then, if the VBS-target is coupled to the third storage node, then the VBS-target may send the acknowledgement to the VBS-initiator that indicates that the access attempt successfully completed.

FIG. 5b illustrates a flow diagram of VBS-target operations 525 in performing a checkpoint synchronization. VBS-target operations 525 may be indicative of operations occurring in a VBS-target, such as VBS-target 255, of a storage node, such as storage node 250, as the VBS-target performs a checkpoint synchronization for the storage node with another storage node. VBS-target operations 525 may occur while the VBS-target is in a normal operating mode.

VBS-target operations 525 may begin with the VBS-target receiving a checkpoint synchronization request (block 530). According to an example embodiment, the VBS-target may receive the checkpoint synchronization request from a VBS-initiator if the VBS-target is coupled to a primary storage node or from another VBS-target if the VBS-target is not coupled to the primary storage node.

From the checkpoint synchronization request, the VBS-target may generate a timestamp (block 532). The VBS-target may then synchronize entries from its own block list with its storage device (block 534). According to an example embodiment, the VBS-target may synchronize entries that are marked with timestamps occurring earlier than the timestamp that it generated from the checkpoint synchronization request.

The VBS-target may then send the checkpoint synchronization request to another VBS-target (if the VBS-target is not coupled to the final storage node) to initiate the checkpoint synchronization at the other VBS-target or an acknowledgement to the VBS-initiator (if the VBS-target is coupled to the final storage node) to indicate that the checkpoint synchronization is complete (block 536).

Figures 5C, 5D:
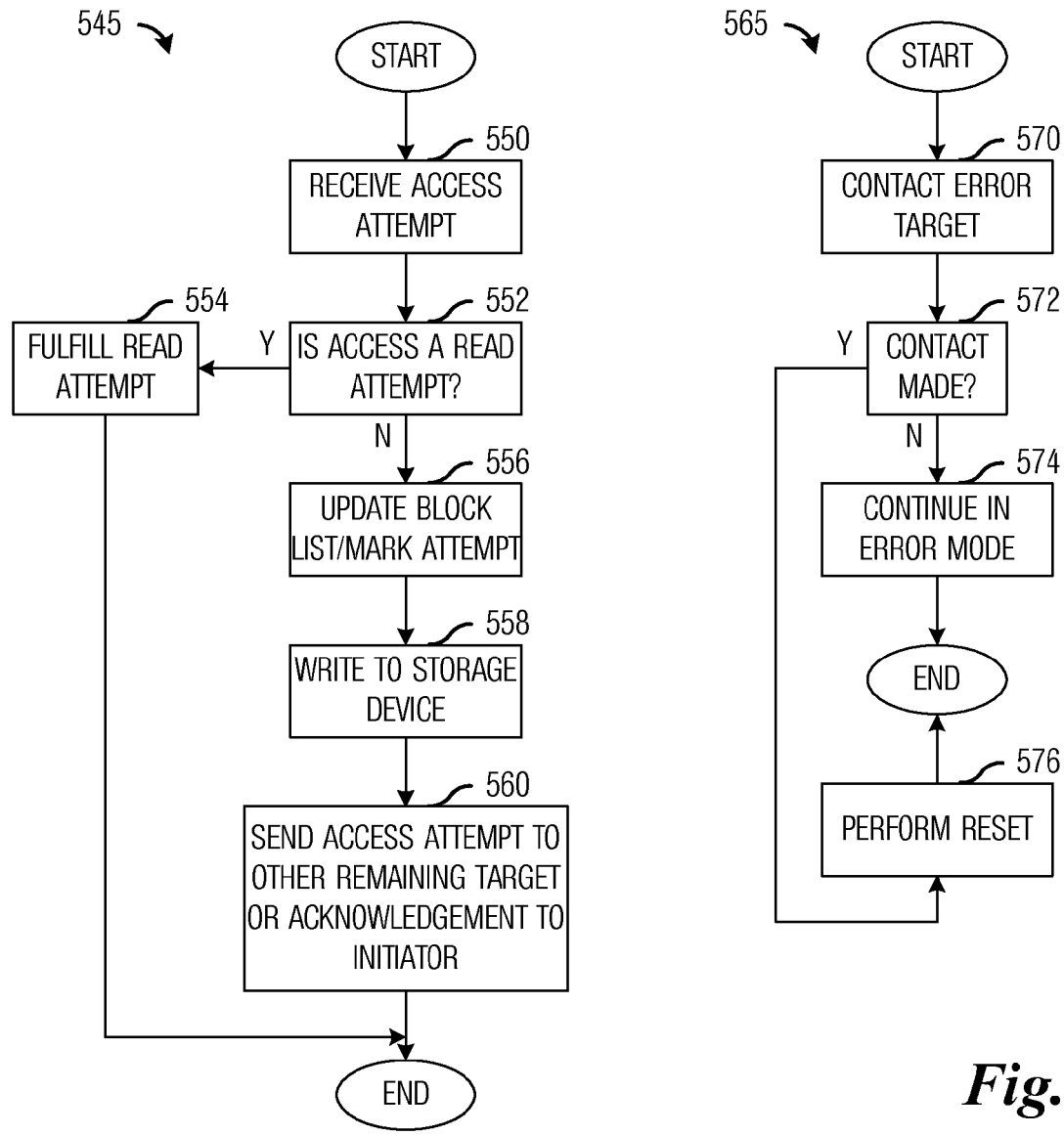
FIG. 5c illustrates an example flow diagram of VBS-target operations in operating in an error mode according to example embodiments described herein.
FIG. 5d illustrates an example flow diagram of VBS-target operations in operating in an error recovery mode according to example embodiments described herein.

FIG. 5c illustrates a flow diagram of VBS-target operations 545 in operating in an error mode. VBS-target operations 545 may be indicative of operations occurring in a VBS-target, such as VBS-target 255, of a storage node, such as storage node 250, as the VBS-target performs operations during the error mode. VBS-target operations 545 may occur while the VBS-target is in a normal operating mode.

VBS-target operations 545 may begin with the VBS-target receiving an access attempt from a VBS-initiator of the computer (block 550). As discussed previously, there may be two different types of access attempts, namely, a read access attempt and a write access attempt. The VBS-target may respond differently depending on the type of the access attempt. The VBS-target may perform a check to determine if the access attempt is a read access attempt (block 552). If the access attempt is a read access attempt, then the VBS-target may fulfill the read attempt by retrieving requested information from its storage device (block 554).

If the access attempt is a write access attempt, then the VBS-target may update its block list with information associated with the write access attempt, including which blocks are affected by the write access attempt, amount of information being written, time of the access attempt, and so on (block 556). The VBS-target may also mark the access attempt as occurring while one or more of the other storage nodes is in an error condition. The VBS-target may also write the information to be written to its storage device (block 558). As an example, the VBS-target may maintain a plurality of indicators with each indicator corresponding to a block in the storage device. Then, if a block is changed by a write access attempt, its corresponding indicator may be set to a specified value, e.g., a true value. The plurality of indicators may then be used to record modified blocks in the storage device.

After updating its block list and writing the information to the storage device, the VBS-target may send a message to either a remaining VBS-target in the high reliability storage system, wherein the message comprises the access attempt, or send an acknowledgement to the VBS-initiator that indicates that the access attempt successfully completed (block 560).

FIG. 5d illustrates a flow diagram of VBS-target operations 565 in operating in an error recovery mode. VBS-target operations 565 may be indicative of operations occurring in a VBS-target, such as VBS-target 255, of a storage node, such as storage node 250, as the VBS-target performs operations during the error recovery mode. VBS-target operations 565 may occur while the VBS-target is in a normal operating mode.

VBS-target operations 565 may begin with the VBS-target attempting to contact a potentially faulty VBS-target coupled to a potentially faulty storage node (block 570). Note that the potentially faulty VBS-target, the potentially faulty storage node, and communications links between the VBS-target and the potentially faulty VBS-target may be faulty or operable, but due to a permanent or a transient failure, a message or an acknowledgement was not propagated, and as a result, an error condition was asserted.

The VBS-target may then perform a check to determine if it was able to establish contact with the potentially faulty VBS-target (block 572). If the VBS-target was not able to establish contact with the potentially faulty VBS-target, then the VBS-target may continue operating in error mode, as described in FIG. 5c, for example (block 574).

If the VBS-target was able to establish contact with the potentially faulty VBS-target (block 572), then the VBS-target may reset itself and wait for the VBS-initiator to re-initiate contact to re-establish operations with the computer and the potentially faulty VBS-target, which is no longer faulty since the VBS-target was able to establish contact with it (block 576).

Figure 6:
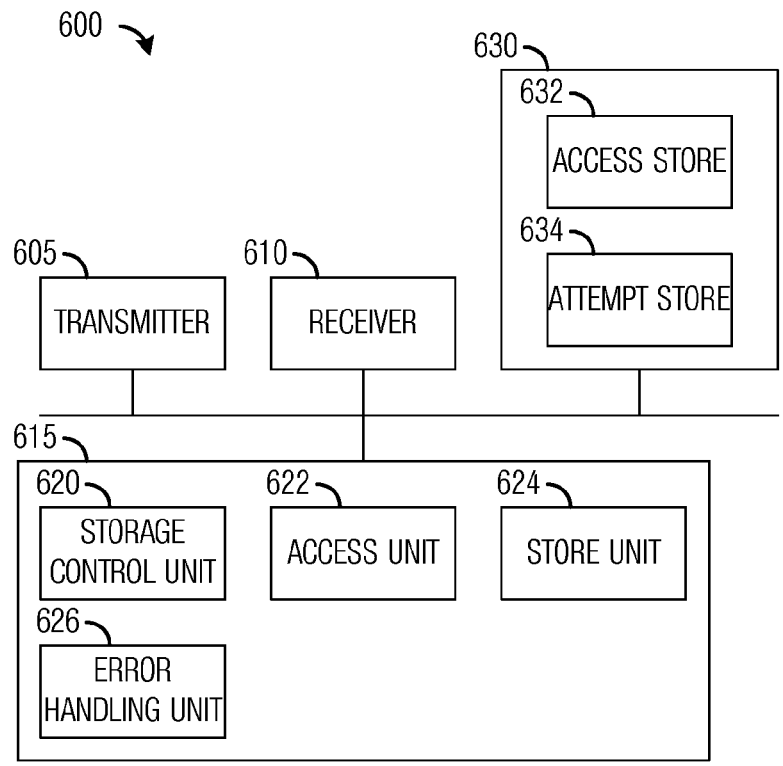
FIG. 6 illustrates an example first device according to example embodiments described herein.

FIG. 6 provides an illustration of a device 600. Device 600 may be an implementation of an initiator, such as a VBS-initiator, of a computer. Device 600 may be used to implement various ones of the embodiments discussed herein. As shown in FIG. 6, a transmitter 605 is configured to send access attempts, information, and indications and a receiver 610 is configured to receive acknowledgements, information, and indications. Transmitter 605 and receiver 610 may have a wireless interface, a wireline interface, or a combination thereof.

A storage control unit 620 is configured to manage access of a storage system coupled to device 600. As an example, storage control unit 620 can initialize the storage system, synchronize the storage system, reset the storage system, and so on. An access unit 622 is configured to control access attempts to the storage system, such as read access attempts and/or write access attempts. Access unit 622 also selects which storage node in the storage system to send an access attempt to and which storage node to expect a response from.

A store unit 624 is configured to create, update, delete, and otherwise manipulate a store of information in a memory 630. Store unit 624 may create and manipulate an access store 632, which is used to store information about write access attempts to the storage system, and an attempt store 634, which is used to store write access attempts to the storage system since a most recent synchronization. An error handling unit 626 is configured to determine if an error has taken place based on responses, acknowledgements, or lack thereof from the storage system. Error handling unit 626 is also configured to operate in an error remedy mode to help recover from errors. Memory 630 is configured to store access attempts, information associated with access attempts, synchronization information, and so forth.

The elements of device 600 may be implemented as specific hardware logic blocks. In an alternative, the elements of device 600 may be implemented as software executing in a processor, controller, application specific integrated circuit, or so on. In yet another alternative, the elements of device 600 may be implemented as a combination of software and/or hardware.

As an example, transmitter 605 and receiver 610 may be implemented as a specific hardware block, while storage control unit 620, access unit 622, store unit 624, and error handling unit 626 may be software modules executing in a processor 615, a microprocessor, a custom circuit, or a custom compiled logic array of a field programmable logic array.

Figure 7:
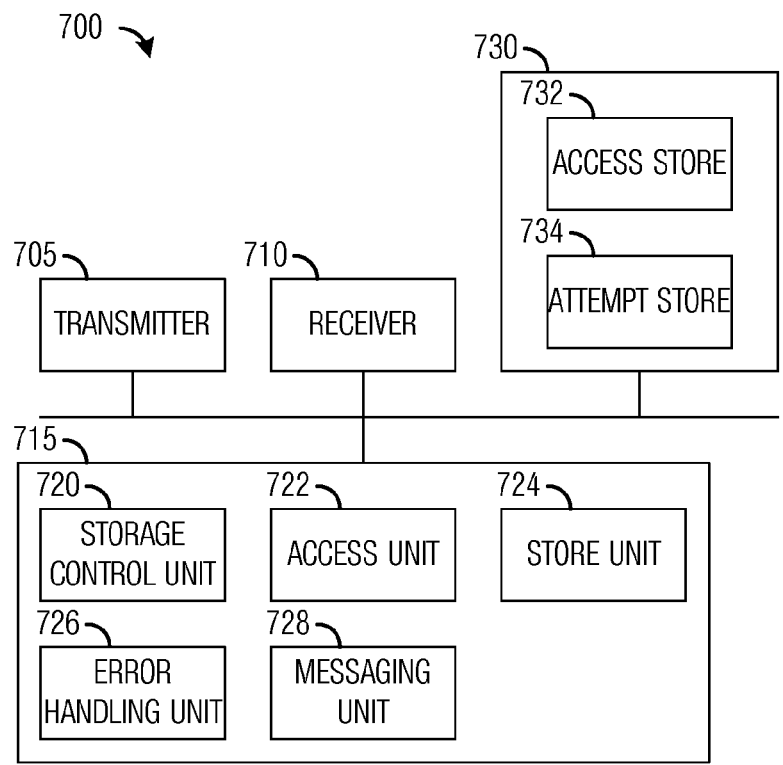
FIG. 7 illustrates an example second device according to example embodiments described herein.

FIG. 7 provides an alternate illustration of a device 700. Device 700 may be an implementation of a target, such as a VBS-target, of a storage node of a storage system. Device 700 may be used to implement various ones of the embodiments discussed herein. As shown in FIG. 7, a transmitter 705 is configured to send access attempts, information, and indications and a receiver 710 is configured to receive acknowledgements, information, and indications. Transmitter 705 and receiver 710 are also configured to communicate to other devices coupled to other storage nodes of the storage system. Transmitter 705 and receiver 710 may have a wireless interface, a wireline interface, or a combination thereof.

A storage control unit 720 is configured to manage access of a storage device coupled to device 700. As an example, storage control unit 720 can initialize the storage device, synchronize the storage device with other storage devices and storage nodes, reset the storage device, and so on. An access unit 722 is configured to control access attempts to the storage device, such as read access attempts and/or write access attempts. Access unit 722 also determines where to send a response to the access attempt based on a position of device 700 in a sequential loop in the storage system.

A store unit 724 is configured to create, update, delete, and otherwise manipulate a store of information in a memory 730. Store unit 724 may create and manipulate an access store 732, which is used to store information about write access attempts to the storage system, and an attempt store 734, which is used to store write access attempts to the storage system since a most recent synchronization. An error handling unit 726 is configured to determine if an error has taken place based on responses, acknowledgements, or lack thereof from the storage system. Error handling unit 726 is also configured to operate in an error remedy mode to help recover from errors. Messaging unit 728 is configured to generate a message responsive to the access attempt and results of the access attempt. Memory 730 is configured to store access attempts, information associated with access attempts, synchronization information, and so forth.

The elements of device 700 may be implemented as specific hardware logic blocks. In an alternative, the elements of device 700 may be implemented as software executing in a processor, controller, application specific integrated circuit, or so on. In yet another alternative, the elements of device 700 may be implemented as a combination of software and/or hardware.

As an example, transmitter 705 and receiver 710 may be implemented as a specific hardware block, while storage control unit 720, access unit 722, store unit 724, error handling unit 726, and messaging unit 728 may be software modules executing in a processor 715, a microprocessor, a custom circuit, or a custom compiled logic array of a field programmable logic array.

The above described embodiments of device 600 and device 700 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 3, 4a, 4b, 4c, 4d, 5a, 5b, 5c, and 5d—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for initiator operations, the method comprising:
    storing information associated with a write access attempt in a store;
    accessing a storage system responsive to the write access attempt by sending the information to a first storage node, wherein the storage system comprises the first storage node and a second storage node arranged in a sequential loop, and wherein the first storage node is accessed by an initiator;
    determining whether the write access attempt completed successfully, comprising:
        determining that the write access attempt completed successfully upon receiving an acknowledgement from the second storage node; and
        determining that the write access attempt did not complete successfully when the acknowledgement from the second storage node is not received;
    in response to the write access attempt completing successfully, deleting the information from the store; and
    in response to the write access not completing successfully:
        indicating an error;
        attempting to connect to the first storage node and the second storage node; and
        re-accessing the storage system in response to the attempting to connect succeeding.

2. The method of claim 1, wherein a second access attempt is a read access attempt, and the method further comprises sending read request information to the first storage node, and determining if the read access attempt completed successfully comprising determining that the access attempt completed successfully upon receiving read information requested in the read access attempt from the first storage node.

3. The method of claim 2, wherein determining if the read access attempt completed successfully comprises determining that the read access attempt did not complete successfully upon not receiving the read information requested in the read access attempt with a first specified time period.

4. The method of claim 1, wherein determining if the write access attempt completed successfully comprises determining that the write access attempt did not complete successfully upon not receiving the acknowledgement within a second specified time period.

5. The method of claim 1, wherein indicating an error comprises asserting an error indicator, setting an error flag, asserting an interrupt, or combinations thereof.

6. The method of claim 1, further comprising indicating that the storage system failed in response to determining that the attempting to connect failed.

7. The method of claim 1, wherein re-accessing the storage system comprises resending the information to the storage system.

8. The method of claim 1, further comprising synchronizing the storage system.

9. The method of claim 8, wherein synchronizing the storage system comprises:
    comparing a first timestamp of the first storage node with a second timestamp of the second storage node; and
    updating an older storage node with an older timestamp with contents of a newer storage node with a newer timestamp.

10. A method for storage node operations, the method comprising:
    receiving, at a storage node, information associated with a write access attempt, wherein the storage node is part of a storage system comprising at least two storage nodes arranged in a sequential loop, wherein the sequential loop comprises a beginning storage node and an ending storage node, and wherein the information is received from a source;
    writing a first subset of the information to a storage device;
    storing a second subset of the information in an attempt store; and
    sending a message to a recipient,
        wherein when the storage node is the beginning storage node, sending the message comprises sending the message toward the ending storage node,
        wherein when the storage node is the ending storage node, sending the message comprises sending the message to an originator of the write access attempt, and
        wherein the recipient is a different entity than the source.

11. The method of claim 10, further comprising:
    receiving, at the storage node, information associated with a read access attempt; and
    providing read information requested in the information associated with the read access attempt.

12. The method of claim 11, wherein providing read information comprises:
    reading the read information from the storage device; and
    transmitting the read information.

13. The method of claim 10, wherein storing the second subset of the information comprises storing information descriptive of the write access attempt.

14. The method of claim 13, wherein the information descriptive of the write access attempt comprises a position indicator of where the first subset of the information was written on the storage device and a length indicator of an amount of information in the first subset of the information.

15. The method of claim 10, wherein when the storage node is the beginning storage node, the message comprises the information.

16. The method of claim 10, wherein the sequential loop further comprises an intermediate storage node between the beginning storage node and the ending storage node, and wherein when the storage node is the beginning storage node, sending the message comprises sending the message to the intermediate storage node.

17. The method of claim 10, wherein when the storage node is the ending storage node, the message comprises an acknowledgement that the write access attempt completed successfully.

18. The method of claim 10, wherein the sequential loop further comprises an intermediate storage node between the beginning storage node and the ending storage node, and wherein when the storage node is the ending storage node, sending the message comprises sending the message to an originator of the write access attempt.

19. The method of claim 10, wherein the sequential loop further comprises an intermediate storage node between the beginning storage node and the ending storage node, and wherein when the storage node is the intermediate storage node, sending the message comprises sending the message to the ending storage node.

20. The method of claim 10, wherein the storage system is in an error state, and wherein the storing the second subset of the information further comprises setting an error state indicator associated with the write access attempt to indicate that the write access attempt occurred while the storage system is in the error state.

21. The method of claim 20, wherein the error state indicator comprises a plurality of indicators, with each indicator corresponding to a block in the storage device, and wherein an indicator associated with a block is set to a specified value.

22. The method of claim 20, further comprising:
attempting to contact a failed storage node;
performing a reset when the attempt to contact the failed storage node succeeded; and
continuing in the error state when the attempt to contact the failed storage node failed.

23. A device comprising:
a store unit configured to store information associated with a write access attempt in a store;
an access unit configured to access a first storage node of a storage system coupled to the device, wherein the access comprises transmitting the information to the first storage node, wherein the access is responsive to the write access attempt, wherein the storage system comprises the first storage node and a second storage node arranged in a sequential loop;
an error handling unit configured to determine if the write access attempt completed successfully, wherein the error handling unit determines the write access attempt completed successfully upon receipt of an acknowledgement from the second storage node, wherein the store unit is further configured to delete the information from the store when the write access attempt completed successfully, and wherein the error handing unit is further configured to indicate an error when the write access attempt did not complete successfully; and
a storage control unit configured to attempt to connect to the first storage node and to the second storage node upon an indication of an error, wherein the access unit is further configured to re-access the storage system in response to determining that the attempt to connect succeeded.

24. The device of claim 23, wherein the store unit is configured to store read request information associated with a read access attempt, wherein the access unit is configured to transmit the read information to the first storage node, and wherein the error handling unit is configured to determines that the read access attempt completed successfully upon receipt of read information requested in the read access attempt from the first storage node.

25. The device of claim 24, wherein the error handling unit is configured to determine that the read access attempt did not complete successfully upon not receiving the read information requested in the read access attempt with a specified time period.

26. A device, wherein the device is part of a storage system comprising at least two storage nodes arranged in a sequential loop, wherein the sequential loop comprises a beginning storage node and an ending storage node, the device comprising:
a receiver configured to receive information associated with a write access attempt from an information source;
an access unit configured to write a first subset of the information to a storage device;
a store unit configured to store a second subset of the information in an attempt store; and
a transmitter configured to transmit a message to a recipient,
wherein the information source comprises an originator of the write access attempt and the recipient comprises the ending storage node, or wherein the information source comprises the beginning storage node and the recipient comprises the originator of the write access attempt, or wherein the information source comprises a downstream storage node and the recipient comprises an upstream storage node,
wherein when the device is the beginning storage node, the information source is the originator of the write access attempt and the recipient is the ending storage node, and
wherein when the device is the ending storage node, the information source is the beginning storage node and the recipient is the originator of the write access attempt.

27. The device of claim 26, wherein the receiver is further configured to receive information associated with a read access attempt, wherein the access unit is further configured to provide read information from the storage device, wherein the access unit provides the read information by reading the read information requested in the information associated with the read access attempt from the storage device, and wherein the device further comprises a messaging unit configured to place the read information into the message.

28. The device of claim 26, wherein the store unit stores a position indicator of where the first subset of the information was written on the storage device and a length indicator of an amount of information in the first subset of the information.

29. The device of claim 26, wherein the sequential loop further comprises an intermediate storage node between the beginning storage node and the ending storage node, wherein when the device is the intermediate storage node, the information source is the beginning storage node and the recipient is the ending storage node.

30. The device of claim 26, wherein an error has been detected in a faulty device, and wherein the device further comprises an error handling unit coupled to the transmitter and to the receiver, the error handling unit configured to initialize an attempt to contact the faulty device, and to reset the device when the attempt to contact the faulty device succeeded.

31. A method of storing and retrieving information, the method comprising:
writing first information from a computer to a first storage node of a remote storage system, wherein the remote storage system comprises the first storage node and a second storage node arranged in a sequential loop such that the first information is copied to the second storage node, the second storage node being located remotely from the first storage node;
determining whether the writing the first information completed successfully, comprising:
determining that the writing the first information completed successfully upon receiving a response from the second storage node at the computer, the response indicating that the information was successfully stored at the second storage node; and
determining that the writing the first information did not complete successfully when the response from the second storage node is not received;
in accordance with the writing the first information completing successfully, reading the first information from the first storage node of the remote storage system; and
in response to the writing the first information not completing successfully:
indicating an error;
attempting to connect to the first storage node and the second storage node; and
re-accessing the storage system in response to the attempting to connect succeeding.

32. The method of claim 31, further comprising:
writing second information from the computer to the first storage node; and
determining that an error has occurred when a response from the second storage node is not received at the computer within a specified time period.

33. The method of claim 32, wherein further comprising:
attempting to connect the first storage node and the second storage node; and
re-writing the second information from the computer to the first storage node in response to determining that the attempting to connect succeeded.

34. A method for storing information, the method comprising:
receiving information from a computer at a beginning storage node of a storage system that includes the beginning storage node and an ending storage node arranged in a sequential loop, wherein the information associated with a write access attempt;
saving information related to the information at the beginning storage node;
sending the information from the beginning storage node to the ending storage node;
writing the information to a first memory at the beginning storage node;
writing the information to a second memory at the ending storage node; and
sending a response to a recipient,
wherein when the response is sent from the beginning storage node, sending the response comprises sending the response toward the ending storage node,
wherein when the response is sent from the ending storage node, sending the response comprises sending the response to an originator of the write access attempt, and
wherein the recipient is a different entity than the computer.

35. The method of claim 34, further comprising saving information related to the information at the ending storage node.

36. The method of claim 34, wherein the writing the information to the first memory at the beginning storage node occurs after the sending the information.

37. The method of claim 34, further comprising:
receiving a read request from the computer at the beginning storage node; and
sending stored information related to the read request from the beginning storage node to the computer.

* * * * *